(12) United States Patent
Bhattacharya et al.

(10) Patent No.: US 11,562,009 B2
(45) Date of Patent: Jan. 24, 2023

(54) GENERATION OF DOMAIN-SPECIFIC MODELS IN NETWORKED SYSTEM

(71) Applicant: GOOGLE LLC, Mountain View, CA (US)

(72) Inventors: Saptarshi Bhattacharya, Seattle, WA (US); Zachariah Phillips, Seattle, WA (US); Shreedhar Madhavapeddi, Mountain View, CA (US); David Maymudes, Seattle, WA (US); Vivek Rao, Redmond, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/205,861

(22) Filed: Mar. 18, 2021

(65) Prior Publication Data

US 2021/0209140 A1    Jul. 8, 2021

Related U.S. Application Data

(63) Continuation of application No. 16/008,988, filed on Jun. 14, 2018, now Pat. No. 10,963,492.

(51) Int. Cl.
*G06F 17/00* (2019.01)
*G06F 7/00* (2006.01)
(Continued)

(52) U.S. Cl.
CPC ........ *G06F 16/3329* (2019.01); *G06F 16/288* (2019.01); *G06F 16/3334* (2019.01);
(Continued)

(58) Field of Classification Search
CPC ............ G06F 16/3329; G06F 16/3334; G06F 16/288; G06F 16/9024; G06F 40/40;
(Continued)

(56) References Cited

U.S. PATENT DOCUMENTS

| 6,011,537 A | 1/2000 | Slotznick |
| 7,788,245 B1 | 8/2010 | Eddings et al. |

(Continued)

FOREIGN PATENT DOCUMENTS

| JP | 2010/514002 | 4/2010 |
| JP | 2015/052971 | 3/2015 |

OTHER PUBLICATIONS

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).

(Continued)

*Primary Examiner* — Pavan Mamillapalli
(74) *Attorney, Agent, or Firm* — Dority & Manning, P.A.

(57) ABSTRACT

The present disclosure is generally directed to the generation of domain-specific, voice-activated systems in interconnected networks. The system can receive input signals that are detected at a client device. The input signals can be voice-based input signals, text-based input signals, image-based input signals, or other type of input signals. Based on the input signals, the system can select domain-specific knowledge graphs and generate responses based on the selected knowledge graph.

20 Claims, 5 Drawing Sheets

(51) Int. Cl.
| | |
|---|---|
| *G06F 16/332* | (2019.01) |
| *G06F 16/33* | (2019.01) |
| *G06F 16/28* | (2019.01) |
| *G06F 16/901* | (2019.01) |
| *G06N 5/02* | (2006.01) |
| *G10L 15/22* | (2006.01) |
| *G06F 40/40* | (2020.01) |
| *G06F 40/205* | (2020.01) |
| *G06F 3/04842* | (2022.01) |

(52) U.S. Cl.
CPC ........ *G06F 16/9024* (2019.01); *G06F 40/205* (2020.01); *G06F 40/40* (2020.01); *G06N 5/02* (2013.01); *G10L 15/22* (2013.01); *G06F 3/04842* (2013.01); *G10L 2015/223* (2013.01)

(58) Field of Classification Search
CPC ..... G06F 40/205; G06F 3/04842; G06N 5/02; G10L 15/22; G10L 2015/223
USPC .......................................... 707/722
See application file for complete search history.

(56) References Cited

U.S. PATENT DOCUMENTS

| | | | |
|---|---|---|---|
| 9,009,192 B1 | 4/2015 | Shmiel et al. | |
| 9,471,666 B2 | 10/2016 | Singh et al. | |
| 9,576,574 B2 | 2/2017 | Van Os | |
| 9,665,662 B1 | 5/2017 | Gautam et al. | |
| 9,798,829 B1 | 10/2017 | Baisley | |
| 10,534,851 B1 | 1/2020 | Chan et al. | |
| 2003/0140056 A1 | 7/2003 | Wall et al. | |
| 2003/0140063 A1* | 7/2003 | Pizzorno | G16Z 99/00 |
| 2003/0158747 A1 | 8/2003 | Beton et al. | |
| 2006/0004739 A1 | 1/2006 | Anthony et al. | |
| 2006/0167857 A1 | 7/2006 | Kraft et al. | |
| 2006/0212288 A1* | 9/2006 | Sethy | G10L 15/18 |
| | | | 704/10 |
| 2007/0204232 A1 | 8/2007 | Ray et al. | |
| 2008/0091633 A1* | 4/2008 | Rappaport | G06N 5/022 |
| | | | 706/50 |
| 2010/0114886 A1 | 5/2010 | Cain et al. | |
| 2011/0288917 A1* | 11/2011 | Wanek | H04W 4/21 |
| | | | 705/14.5 |
| 2012/0246003 A1* | 9/2012 | Hart | G06Q 30/0261 |
| | | | 705/14.57 |
| 2012/0260158 A1 | 10/2012 | Steelberg | |
| 2013/0151238 A1* | 6/2013 | Beaurpere | G06F 40/40 |
| | | | 704/9 |
| 2013/0311458 A1 | 11/2013 | Goel et al. | |
| 2013/0311875 A1 | 11/2013 | Pappas et al. | |
| 2014/0006370 A1 | 1/2014 | Keshri et al. | |
| 2014/0222436 A1 | 8/2014 | Binder et al. | |
| 2015/0234930 A1 | 8/2015 | Lakkur et al. | |
| 2015/0309682 A1 | 10/2015 | Lee et al. | |
| 2016/0180437 A1* | 6/2016 | Boston | G06Q 30/0631 |
| | | | 705/26.7 |
| 2016/0180438 A1* | 6/2016 | Boston | G06Q 30/0282 |
| | | | 705/26.7 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0163584 A1 | 6/2017 | Meng et al. | |
| 2017/0257456 A1 | 9/2017 | Vaish et al. | |
| 2017/0358301 A1 | 12/2017 | Raitio et al. | |
| 2018/0084079 A1* | 3/2018 | Williams | H04W 4/00 |
| 2018/0113933 A1 | 4/2018 | Lewis et al. | |
| 2018/0137267 A1 | 5/2018 | Krieger et al. | |
| 2018/0150524 A1* | 5/2018 | Anger | G06F 16/9535 |
| 2018/0173714 A1 | 6/2018 | Moussa et al. | |
| 2018/0302347 A1 | 10/2018 | Landowski et al. | |
| 2018/0332167 A1 | 11/2018 | Lu et al. | |
| 2018/0349517 A1 | 12/2018 | Kleiman-Weiner et al. | |
| 2019/0179878 A1 | 6/2019 | Collins et al. | |
| 2020/0114886 A1 | 4/2020 | Kim | |

OTHER PUBLICATIONS

"'Dolphin' attacks fool Amazon, Google voice assistants", BBC News, Sep. 7, 2017 (8 pages).

"GoogleAssistant SDK", Google Developers, Google, retrieved Aug. 22, 2017 from URL: https://developers.google.com/assistant/sdk/ (4 pages).

"Products Feed Specification", Google Merchant Center Help, Google, Inc., retrieved Mar. 18, 2013 from URL: http://www.support.google.com/merchants/bin/answer.py?hl=en&answer=188494#US (6 pages).

"Supported File Formats", Google Merchant Center Help, Google, Inc., retrieved Mar. 18, 2013 from URL: http://www.support.google.com/merchants/bin/answer.py?hl=en&answer=160567 (1 page).

"Walmart and Google to offer voice-enabled shopping", BBC News, Aug. 23, 2017 (10 pages).

Abrams, Brad, "Help users find, interact & re-engage with your app on the Google Assistant", Google Developers Blog, Nov. 15, 2017 (16 pages).

Albrecht, Chris, "Alexa, How Can you be Used in Restaurants?", The Spoon, Dec. 10, 2017 (6 pages).

Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).

Barr, Jeff, "AWS DeepLens—Get Hands-On Experience with Deep Learning With Our New Video Camera", AWS News Blog, Nov. 29, 2017 (11 pages).

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018 (6 pages).

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Coberly, Cohen, "Apple patent filing reveals potential whispering Siri functionality", Techspot, Dec. 14, 2017 (4 pages).

Collins, et al., "Can Twitter Save Itself?", CNET, Apr. 26, 2017, retrieved Aug. 22, 2017 from URL: https://www.cnet.com/news/twitter-q1-2017-earnings/ (3 pages).

Corrected Notice of Allowability for U.S. Appl. No. 16/008,988 dated Jan. 27, 2021 (2 pages).

Crist, Ry, "Logitech Harmony's Alexa skill just got a whole lot better", CNET, Jul. 13, 2017 (2 pages).

Estes, Adam Clark, "Amazon's Newest Gadget is a Tablet That's Also an Echo", Gizmodo, Sep. 19, 2017 (3 pages).

Final Office Action for U.S. Appl. No. 16/008,988 dated Jun. 11, 2020 (23 pages).

Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).

Gebhart, Andrew, "Google Home to the Amazon Echo: 'Anything you can do . . . '", CNET, May 18, 2017 (7 pages).

Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).

Golgowski, Nina, "This Burger King Ad is Trying to Control Your Google Home Device", HuffPost, Apr. 12, 2017 (7 pages).

(56) References Cited

OTHER PUBLICATIONS

Gurman, et al., "Apple is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability for PCT Appln. Ser. No. PCT/US2019/021882 dated Dec. 24, 2020 (10 pages).
International Search Report and Written Opinion for PCT Appln. Ser. No. PCT/US2019/021882 dated May 20, 2019 (16 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", Bbc News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 16/008,988 dated Feb. 6, 2020 (19 pages).
Non-Final Office Action for U.S. Appl. No. 16/008,988 dated Sep. 1, 2020 (22 pages).
Notice of Allowance for U.S. Appl. No. 16/008,988 dated Dec. 4, 2020 (12 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges at 'Silicon Beach'", Law360, Los Angeles, California, Feb. 2, 2017 (4 pages).
Willens, Max, "For publishers, Amazon Alexa holds promise but not much money (yet)", Digiday, Jul. 6, 2017 (6 pages).

\* cited by examiner

GENERATION OF DOMAIN-SPECIFIC MODELS IN NETWORKED SYSTEM

CROSS REFERENCE TO RELATED APPLICATIONS

The present application claims priority under 35 U.S.C. § 120 as a continuation application of U.S. patent application Ser. No. 16/008,988, titled "GENERATION OF DOMAIN-SPECIFIC MODELS IN NETWORK SYSTEM," filed Jun. 14, 2018, which is incorporated herein by reference in its entirety.

BACKGROUND

In a networked environment, such as the Internet or other networks, first-party content providers can provide information for public presentation on resources such as web pages, documents, applications, and other resources. The first-party content can include text, video, and audio information provided by the first-party content providers. A user accessing the resources may request or wish to receive additional information about information related to the resources. To view or receive the additional information, the user needs to leave the currently viewed resource.

SUMMARY

According to at least one aspect of the disclosure, a system to generate natural language processing models in a networked system can include a data processing system. The data processing system can include one or more processors and memory. The one or more processors can execute a natural language processor component and a digital component selector. The data processing system can receive, by the natural language processor component and via an interface of the data processing system, an input audio signal detected by a sensor at a first client device. The data processing system can parse, by the natural language processor component, the input audio signal to identify a first search request in the first search request in the input audio signal. The data processing system can select, by a digital component selector executed by the data processing system, a search result based on at least the first search request. The data processing system can select, by the digital component selector, a digital component based on the first search request. The digital component can include a link to a data source. The data source can include a plurality of entities. The digital component can include an input interface to request responses based on the knowledge graph.

The data processing system can transmit, by the interface, the digital component including the link to the with the data source and associated with the knowledge graph to the first client device with the search result. The data processing system can receive, by the interface and via the input interface of the digital component rendered by the client device, a second search request. The data processing system can select, by the digital component selector and based on the knowledge graph, a response based to the second search request. The data processing system can transmit, by the interface, the response to the first client device to render the response within the digital component.

According to at least one aspect of the disclosure, a method to generate natural language processing models in a networked system can include receiving, by a natural language processor component executed by a data processing system and via an interface of the data processing system, an input audio signal detected by a sensor at a first client device. The method can include parsing, by the natural language processor component, the input audio signal to identify a first search request in the first search request in the input audio signal. The method can include selecting, by a digital component selector executed by the data processing system, a search result based on the at least the first search request. The method can include selecting, by the digital component selector, a digital component based on the first search request. The digital component can be associated with a data source and a knowledge graph based on the data source. The method can include transmitting, by the digital component selector, the digital component associated with the data source and the knowledge graph based on the data source to the first client device with the search result.

According to at least one aspect of the disclosure, a system to generate natural language processing models in a networked system can include a data processing system. The data processing system can include one or more processor and memory. The one or more processors can execute a digital component selector and a natural language processor component. The data processing system can receive, by the digital component selector, a content request from a client device. The data processing system can select, by the digital component selector, a digital component based on the content request. The digital component can be associated with a data source and a knowledge graph based on the data source. The data processing system can transmit, by the digital component selector, the digital component to the client computing device to render the digital component in a content slot. The data processing system can receive, by the natural language processor component and via an interface of the data processing system, an input audio signal detected by a sensor at the client device. The data processing system can parse, by the natural language processor component, the input audio signal to identify a request in the input audio signal. The data processing system can select, by the natural language processor component, a response to the request based on the knowledge graph. The data processing system can transmit, by the interface, the response to the client computing device.

According to at least one aspect of the disclosure, a method to generate natural language processing models in a networked system can include receiving, by a digital component selector executed by a data processing system, a content request from a client computing device. The method can include selecting, by the digital component selector, a digital component based on the content request. The digital component can be associated with a data source and a knowledge graph based on the data source. The method can include transmitting, by the digital component selector, the digital component to the client computing device to render the digital component in a content slot. The method can include receiving, by the natural language processor, an input audio signal detected by a sensor at the client device. The method can include parsing, by the natural language processor component, the input audio signal to identify a request in the input audio signal. The method can include selecting, by the natural language processor component, a response to the request based on the knowledge graph. The method can include transmitting, by the interface, the response to the client computing device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems to generate voice-activated data flows in interconnected network. The various concepts introduced above and discussed in greater detail below may be implemented in any of numerous ways.

The present disclosure is generally directed to the generation of domain-specific, voice-activated systems in interconnected networks. The system can receive input signals that are detected at a client device. The input signals can be voice-based input signals, text-based input signals, image-based input signals, or other type of input signals. The input signals can include requests, such as search requests. Because of the conversational nature of the input signals, the requests can be vague, broad, or lack context. The system can use the domain-specific knowledge graphs to generate responses to the requests. Interfaces to the domain-specific knowledge graphs can be incorporated into digital components that are provided in response to search requests or provided with first party content on a web page.

Systems and methods of the present technical solution enable a reduction in reducing network bandwidth by reducing the number of network transmissions required to complete voice-based requests. The present solution can enable the digital assistant to select specific responses to unclear requests, which can reduce the number of follow up input audio signals required to complete a request.

Figure 1:
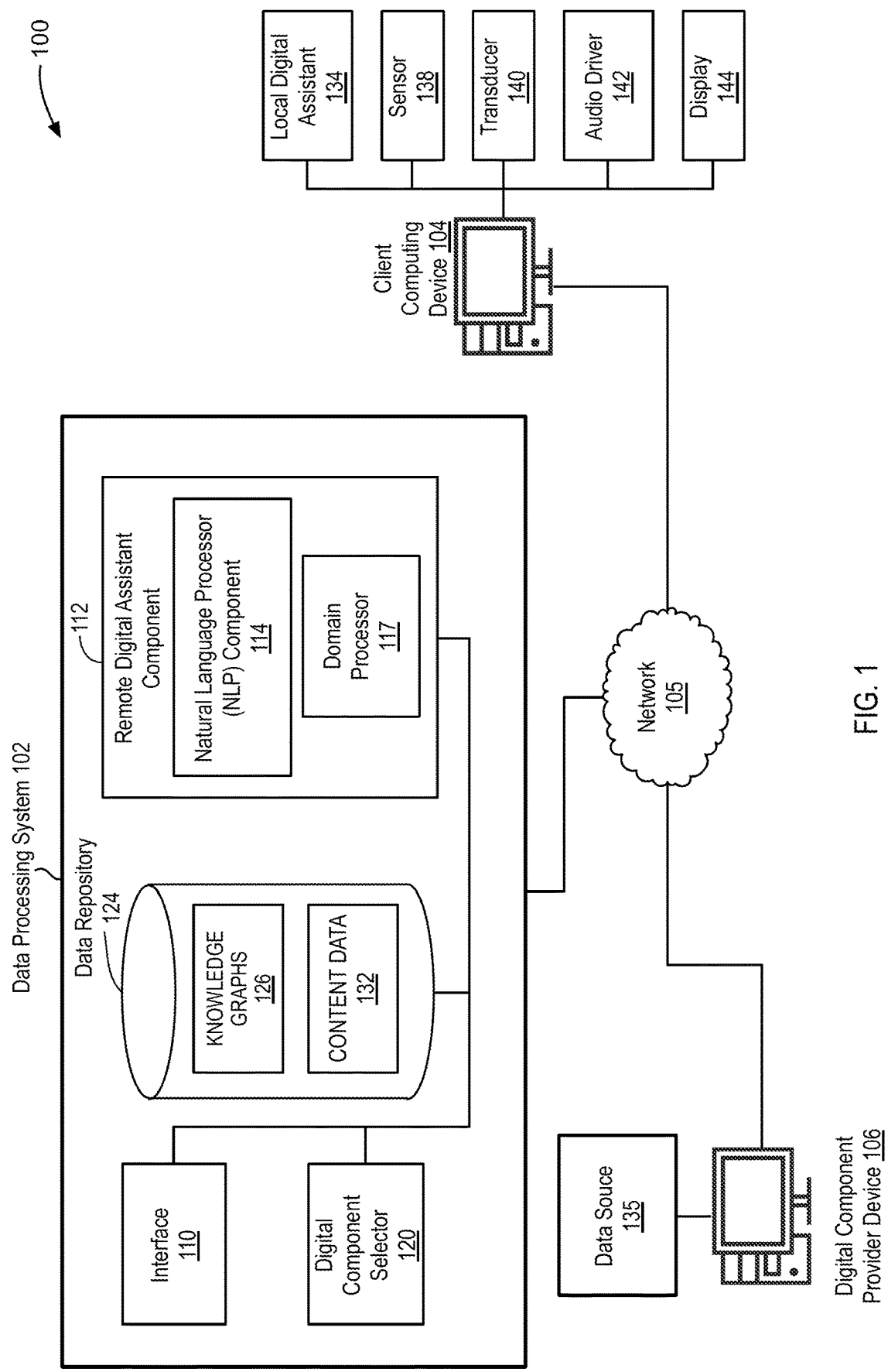
FIG. 1 illustrates an example system to generate responses based on domain-specific natural language models in a networked computer environment, in accordance with an example of the present disclosure.

FIG. 1 illustrates an example system 100 to generate responses based on domain-specific natural language models in a networked computer environment. The system 100 can include a data processing system 102. The data processing system 102 can communicate with one or more digital component provider devices 106 (e.g., content provider devices) or client computing devices 104 via a network 105.

The system 100 can include one or more networks 105. The network 105 can include computer networks such as the Internet, local, wide, metro, or other area networks, intranets, satellite networks, other communication networks such as voice or data mobile telephone networks, or any combination thereof.

The data processing system 102 and client computing device 104 can access digital components and data sources 135 via the network 105. The network 105 can be used to access data sources such as web pages, websites, domains (e.g., a collection of web pages), or uniform resource locators. The digital components can be presented, output, rendered, or displayed on at least one computing device 104, such as a laptop, desktop, tablet, digital assistant, personal digital assistant, smartwatch, wearable device, smart phone, portable computer, or speaker. For example, via the network 105 a user of the client computing device 104 can access a website (an example data source 135) provided by digital component provider devices 106. The website can include one or more digital components, such as first- and third-party content.

The network 105 can include or constitute a display network, e.g., a subset of information resources available on the internet that are associated with a content placement or search engine results system or that are eligible to include third-party digital components. The network 105 can be used by the data processing system 102 to access information resources such as web pages, websites, domain names, or uniform resource locators that can be presented, output, rendered, or displayed by the client computing device 104.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example, with the computing device 104 or the digital component provider device 106. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm, or a machine farm. The servers can also be geographically dispersed. A data center or machine farm may be administered as a single entity, or the machine farm can include a plurality of machine farms. The servers within each machine farm can be heterogeneous; one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The client computing device 104 can include, execute, interface, or otherwise communicate with one or more of at least one local digital assistant 134, at least one sensor 138, at least one transducer 140, at least one audio driver 142, or at least one display 144. The client computing device 104 can interface with one or more interfaces, such as a graphical or physical keyword.

The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software components configured to provide a visual indication or optical output, such as a light emitting diode, organic light emitting diode, liquid crystal display, laser, or display.

The client computing device 104 may or may not include a display. For example, the client computing device 104 may include limited types of user interfaces, such as a microphone and speaker (e.g., the client computing device 104 can include a voice-drive or audio-based interface). The client computing device 104 can be a speaker-based digital assistant. The primary user interface of the computing device 104 can include a microphone and speaker.

The client computing device 104 can include, execute, interface, or otherwise communicate with the local digital assistant 134. The local digital assistant 134 can detect input signals, such as audio input signals, at the client computing device 104. The input signals can include requests or search requests. The local digital assistance 134 can be an instance of the remote digital assistance component 112 executed at the data processing system 102 or can perform any of the functions of the remote digital assistance component 112.

The local digital assistant 134 can filter out one or more terms or modify the terms prior to transmitting the terms as data to the data processing system 102 (e.g., remote digital assistant component 112) for further processing. The local digital assistant 134 can convert the analog audio signals detected by the transducer 140 into a digital audio signal and transmit one or more data packets carrying the digital audio signal to the data processing system 102 via the network 105. The local digital assistant 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 134 can interface with one or more of the knowledge graphs 126 hosted or generated by the data processing system 102. The local digital assistant 134 can provide or render an interface to the knowledge graphs 126. For example, the local digital assistant 134 can receive input signals that are transmitted to the data processing system 102. The remote digital component assistant 112 can determine a response to the request based at least on the knowledge graph 126. The local digital assistant 134 can interface with the knowledge graphs 126 to provide results or responses to requests parsed from input signals.

The local digital assistant 134 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102, and manage rendering of a graphical user interface provided via the display 144.

The client computing device 104 can be associated with an end user that enters voice queries as audio input into the client computing device 104 (via the sensor 138 or transducer 140) and receives audio (or other) output to present, display, or render to the end user of the client computing device 104 from the data processing system 102 or digital component provider device 106.

The digital component can include a computer-generated voice that can be provided from the data processing system 102 or digital component provider device 106 to the client computing device 104. The client computing device 104 can render the computer-generated voice to the end user via the transducer 140 (e.g., a speaker). The computer-generated voice can include recordings from a real person or computer-generated language. The client computing device 104 can provide visual output via a display device 144 communicatively coupled to the computing device 104. The client computing device 104 can receive queries from the end user via a keyboard. The query can be a request or a search request.

The client computing device 104 can receive an input audio signal detected by a sensor 138 (e.g., microphone) of the computing device 104. The input audio signal or other form of input signal can include, for example, a query, question, command, instructions, request, search request, or other statement provided in a spoken language.

The client computing device 104 can include, execute, or be referred to as a digital assistant device. The digital assistant device can include one or more components of the computing device 104. The digital assistant device can include a graphics driver that can receive display output from the data processing system 102 and render the display output on display 132. The graphics driver can include hardware or software components that control or enhance how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component 140 can receive an indication of the display output and instruct the audio driver 142 to generate an output audio signal to cause the speaker component (e.g., transducer 140) to transmit an audio output corresponding to the indication of the display output.

The system 100 can include, access, or otherwise interact with at least digital component provider device 106. The digital component provider device 106 can include one or more servers that can provide digital components to the client computing device 104 or data processing system 102. The digital component provider device 106 can provide or be associated with data sources 135. The data sources 135 can be websites or landing pages. The digital components provided by the digital component provider device 106 can be associated with a data source 135 provided by the digital component provider device 106. For example, the digital component can be third-party content that includes a link to a data source 135, such as a landing page, provided by the digital component provider device 106.

The digital component provider device 106 or components thereof can be integrated with the data processing system 102 or executed at least partially by the data processing system 102. The digital component provider device 106 can include at least one logic device such as a computing device having a processor to communicate via the network 105, for example, with the computing device 104, the data processing system 102, or the digital component provider device 106. The digital component provider device 106 can include at least one computation resource, server, processor, or memory. For example, the digital component provider device 106 can include a plurality of computation resources or servers located in at least one data center.

A digital component provider device 106 can provide audio, visual, or multimedia-based digital components for presentation by the client computing device 104 as output digital components or visual output digital components. The digital components can be websites, web pages, applications, text-based content, audio-based content, video-based content, other digital documents, or any combination thereof. The digital component can be or include digital content. The digital component can be or include a digital object. A digital component can include a plurality of digital content items or other digital components. For example, a digital component can be a website that includes other digital components such as ads or content from third parties. A digital component can include an instance of the local digital assistant 134 or cause the client computing device 104 to execute an instance of the local digital assistant 134.

The digital component provider device 106 can provide the digital components to the client computing device 104 via the network 105 and bypass the data processing system 102. The digital component provider device 106 can provide the digital component to the client computing device 104 via the network 105 and data processing system 102. For example, the digital component provider device 106 can provide the digital components to the data processing system 102, which can store the digital components and provide the digital components to the client computing device 104 when requested by the client computing device 104. The digital components can be from a data source 135. The data source can be a server hosting a webpage, landing page, or other content.

The data processing system 102 can include at least one computation resource or server. The data processing system 102 can include, interface, or otherwise communicate with at least one interface 110. The data processing system 102 can include, interface, or otherwise communicate with at least one remote digital assistant component 112. The remote digital assistant component 112 can include, interface, or otherwise communicate with at least one NLP component 114, and at least one domain processor 117. The data processing system 102 can include, interface, or otherwise communicate with at least one digital component selector 120. The data processing system 102 can include, interface, or otherwise communicate with at least one data repository 124. The at least one data repository 124 can include or store, in one or more data structures or databases, knowledge graphs 126 and content data 132.

The components of the data processing system 102 can each include at least one processing unit or other logic device such as a programmable logic array engine or module configured to communicate with the database repository or database 124. The components of the data processing system 102 can be separate components, a single component, or part of multiple data processing systems 102. The system 100 and its components, such as a data processing system 102, can include hardware elements, such as one or more processors, logic devices, or circuits.

The data processing system 102 can include an interface 110. The interface 110 can be configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface ("API") that includes definitions for communicating between various components, such as software components.

The remote digital assistant component 112 of the data processing system 102 can execute or run an NLP component 114 to receive or obtain the data packets including the input signal. The input signal can include input audio signals detected by the sensor 138 of the computing device 104 or other input signals, such as entered text. For example, the input signal can include text input into the client computing device 104 by a user via a keyboard or other text entry system. The data packets can provide a digital file. The NLP component 114 can receive or obtain the digital file or data packets comprising the input signal and parse the input signal. For example, the NLP component 114 can enable for interactions between a human and a computer. The NLP component 114 can be configured with techniques for converting the input signal to text and understanding natural language to enable the data processing system 102 to derive meaning from human or natural language input.

The NLP component 114 can include or be configured with techniques based on machine learning, such as statistical machine learning. The NLP component 114 can utilize decision trees, statistical models, or probabilistic models to parse the input audio signal. The NLP component 114 can perform, for example, functions such as named entity recognition (e.g., given a stream of text, determine which items in the text map to names, such as people or places, and what the type of each such name is, such as a person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 114 can convert the input audio signal into recognized text by comparing the input signal against a stored, representative set of audio waveforms (e.g., in the data repository 124) and choosing the closest matches. The set of audio waveforms can be stored in the data repository 124 or other database accessible to the data processing system 102. The representative waveforms can be generated across a large set of users, and then may be augmented with speech samples from the user. After the audio signal is converted into recognized text, the NLP component 114 matches the text to words that are associated, for example, via training across users or through manual specification, with actions that the data processing system 102 can serve. The NLP component 114 can convert image or video input into text or digital files. The NLP component 114 can process, analyze, or interpret image or video input to perform actions, generate requests, or select or identify data structures.

The NLP component 114 can obtain the input signal. From the input signal, the NLP component 114 can identify at least one request. The request can indicate intent or digital components or can be a search request. The request can be an expressly stated request for information. For example, the request can be the question "what colors does car model X come in?" The intent can also be derived or not expressly stated. For example, in the input signal "car model X 2018," the input signal does not expressly state that the user wants information about the 2018 car model X, but the NLP component 114 can derive the intent.

The NLP component 114 can parse the input signal to identify, determine, retrieve, or otherwise obtain the request from the input signal. For instance, the NLP component 114 can apply a semantic processing technique to the input signal to identify a search request in the input signal.

The data processing system 102 can include or interface with an instance of the domain processor 117. The domain processor 117 can be any script, file, program, application, set of instructions, or computer-executable code, that is configured to enable a computing device on which the domain processor 117 is executed to generate knowledge graphs 126.

The domain processor 117 can generate knowledge graphs 126 that are domain-specific. For example, the domain processor 117 can generate knowledge graphs 126 for different specific websites, domains, data collections, other data sources 135. The domain processor 117 can generate a knowledge graph 126 for each of the digital components that the data processing system 102 receives from the digital component provider device 106. The domain processor 117 can save the knowledge graphs 126 into the data repository 124. The domain processor 117 can save the knowledge graphs 126 in a relational database.

The data sources 135, such as the websites under a specific domain, can include terms, phrases, or other data that can generally be referred to as entities. The knowledge graphs 126 for a given data source 135 can include nodes that represent the entities in the data source 135.

A knowledge graph 126 can include edges or links that connect related nodes in the knowledge graph 126. The edges can represent relationships between the entities. For example, two nodes linked by an edge can indicate that the entities represented by the nodes are related. The domain processor 117 can assign weights to the edges. The weights can indicate a degree of the relationship between the nodes connected by the link. For example, an edge with a higher weight can indicate that the two entities represented by the nodes are more related to one another than two entities that are connected by an edge with a relatively lower weight. An edge can represent a semantic relationship between the entities represented by the nodes connected by the edge. The domain processor 117 can process the text, phrases, or other entities of the data source with the NLP component 114 to generate the knowledge graph 126.

The domain processor 117 can generate a knowledge graph 126 based on the entities of a data source. The data source can be related to or associated with a digital component. For example, the digital component can be third-party content that is displayed with the first-party content of a web page. The digital component can include a link to a landing page, web site, or other data source. The domain processor 117 can generate a knowledge graph 126 of the data source (e.g., the landing page) to which the digital component links. The domain processor 117 can store the knowledge graph 126 in the data repository 124 in association with an indication of the data source. The domain processor 117 can generate a different knowledge graph 126 for each of the digital components transmitted to the client computing device 104 for rendering.

The knowledge graph 126 for a digital component can be generated from only first order data. For example, the knowledge graph 126 can be generated based only on the entities and other data included in the data source 135 that is associated with the digital component. The knowledge graph 126 for a digital component can be generated from first and second order data. First order data can be the entities and other data included in the data source 135 that is associated with the digital component. Second order data can be entities and other data that are associated with different data sources 135 or web searches. The domain processor 117 can assign different weighting factors to the first order data and the second order data. For example, the entities from the first order data can have a relatively larger effect on the edge strength between two nodes when compared to the entities from second order data.

The digital component provider device 106 can transmit digital components to the data processing system 102. The data processing system 102 can store the digital components as content data 132. The digital components can be used as third-party content for websites. The digital components can include a uniform resource locator or link to a landing page or other data source 135. When the data processing system 102 receives a digital component from a digital component provider device 106, the domain processor 117 can generate a knowledge graph 126 for the data source 135 linked to by the digital component. The domain processor 117 can store the knowledge graph 126 in the data repository 124 in association with an indication of the data source or the digital component.

The domain processor 117 can generate and include an interface to the knowledge graph 126 into the digital component. The interface can be a link or deep link that causes an instance of the local digital assistant 134 to execute on the client computing device 104. For example, the client computing device 104 can receive the digital component in response to a request. Rendering the digital component can cause the client computing device 104 to launch or execute an instance of the local digital assistant 134. Responses to requests presented to the rendered digital component can be generated based on the knowledge graph 126.

The data processing system 102 can execute or run an instance of the digital component selector 120. The digital component selector 120 can select a digital component that includes text, strings, characters, video files, image files, or audio files that can be processed by the client computing device 104 and presented to the user via the display 144 or the transducer 140 (e.g., speaker).

The digital component selector 120 can select a digital component that is responsive or associated with the request identified by the NLP component 114 in the input audio signal. The digital component selector 120 can select which digital component provider device 106 should or can fulfill the request and can forward the request to the digital component provider device 106. For example, the data processing system 102 can initiate a session between the digital component provider device 106 and the client computing device 104 to enable the digital component provider device 106 to transmit the digital component to the client computing device 104. The digital component selector 120 can request a digital component from the digital component provider device 106. The digital component provider device 106 can provide digital components to the data processing system 102, which can store the digital components in the data repository 124. Responsive to a request for a digital component, the digital component selector 120 can retrieve the digital component from the data repository 124.

The digital component selector 120 can select multiple digital components via a real-time content selection process. The digital component selector 120 can score and rank the digital components and select a digital component from a plurality of digital components based on the score or rank of the digital components. The digital component selector 120 can select one or more additional digital components that are transmitted to a second client computing device 104 based on an input audio signal (or keywords and requests contained therein). The digital component selector 120 can select additional digital components (e.g., ads) that are associated with a different digital component provider device 106.

The digital component selector 120 can provide the digital component selected in response to the request identified in the input signal to the computing device 104, or local digital assistant 134, or application executing on the computing device 104 for presentation. Thus, the digital component selector 120 can receive the content request from the client computing device 104, select, responsive to the content request, a digital component, and transmit, to the client computing device 104, the digital component for presentation. The digital component selector 120 can transmit, to the local digital assistant 134, the selected digital component for presentation by the local digital assistant 134 itself or a third-party application executed by the client computing device 104. For example, the local digital assistant 134 can play or output an audio signal corresponding to the selected digital component.

The data repository 124 store content data 132 that can include, for example, digital components provided by a digital component provider device 106 or obtained or determined by the data processing system 102 to facilitate content selection. The content data 132 can include, for example, digital components (or a digital component object) that can include, for example, a content item, an online document, audio, images, video, multimedia content, or third-party content. The content data 132 can include digital components, data, or information provided by the client computing devices 104 (or end user thereof). For example, the content data 132 can include user preferences, user information stored by the user, or data from prior input audio signals.

Figure 2:
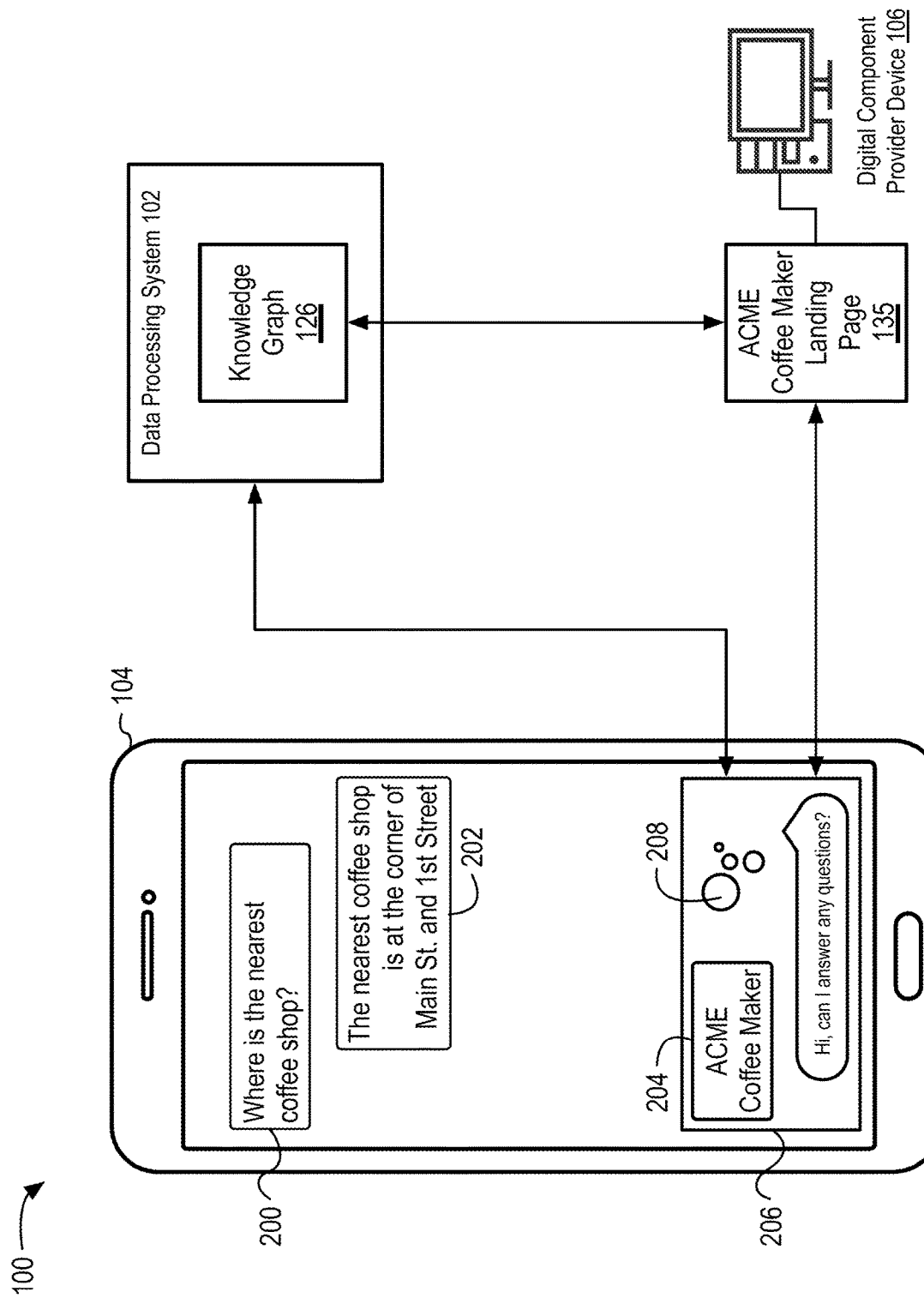
FIG. 2 illustrates a block diagram of the system illustrated in FIG. 1 generating and using example knowledge graphs, in accordance with an example of the present disclosure.

FIG. 2 illustrates a block diagram of the system 100 generating and using example knowledge graphs 126 to generate responses. As illustrated in FIG. 2, the system 100 includes a client computing device 104. The client computing device 104 is in communication with the data processing system 102 and the digital component provider device 106. The digital component provider device 106 can host, serve, or otherwise be associated with a data source 135. As illustrated in FIG. 2, the data source 135 can be a landing page. The landing page can be a website that is associated with a digital component. For example, the digital component can include a link to the landing page. The digital component can be third-party content that is presented on a website with first-party content. In this example, the digital component can be an ad for an ACME coffee maker, and the data source 135 can be a landing page for the ACME coffee maker.

The digital component provider device 106 can provide the digital component (in this example for the ACME coffee maker) to the data processing system 102. The digital component selector 120 can receive the digital component and store the digital component in the data repository 124. The data processing system 102 can generate a knowledge graph 126 based on the digital component. The data processing system 102 can generate the knowledge graph 126 based on the data source 135 associated with the digital component. For example, the domain processor 117 can process, via the NLP component 114, the text or other content of the landing page associated with the digital component. The data processing system 102 can store the knowledge graph 126 in the data repository 124. The digital component provider device 106 can generate the knowledge graph 126 associated with the digital component and provide the knowledge graph 126 to the data processing system 102 with the digital component.

In the example illustrated in FIG. 2, the client computing device 104 can be a mobile phone. The client computing device 104 can receive an input signal 200. The client computing device 104 can receive the input signal as an input audio signal. For example, the user can speak a request to the client computing device 104. An instance of the NLP component 114 (executed at the client computing device 104 or data processing system 102) can parse the input signal to determine the text of the input signal. The client computing device 104 can receive the input signal via a keyboard. For example, the user can type the request. The NLP component 114 can parse the input signal to identify a request, such as a search request, in the input signal 200. As illustrated in FIG. 2, the NLP component 114 can parse the input signal 200 to identify the search request as "where is the nearest coffee shop?"

The client computing device 104 can transmit the input signal to the data processing system 102. The data processing system 102 can select a response to the search request parsed from the input signal. The data processing system 102 can transmit the search response to the client computing device 104 for rendering. As illustrated in FIG. 2, the response can be rendered to the user as a search response 202. The search response 202 can be rendered as a text, images, video, audio, or any combination thereof. For example, as illustrated in FIG. 2, the search response 202 is rendered as text. When the client computing device 104 is a speaker-based digital assistant, the search response 202 can be rendered as an audio output signal.

Based on the search request, the digital component selector 120 of the data processing system 102 can select a digital component 204. The data processing system 102 can transmit the digital component 204 to the client computing device 104. The client computing device 104 can render the digital component 204 to display or present the digital component 204 to the user with the search response 202. The digital component 204 can be included in another digital component 206. The digital component 206 can be executed by the local digital assistant 134. The digital component 206 can include an interface 208 to the knowledge graph 126. The interface 208 can be configured to receive input signals, such as text or audio-based input signals. The interface 208 can be referred to as an input interface 208. The digital components 204 or 206 can include a link to the landing page 135. Selecting the digital components 204 or 206 can cause the client computing device 104 to activate a web browser that loads the address identified in the link for the landing page 135.

The interface 208 can accept input signals, such as audio-based or text-based input signals. The client computing device 104 can receive the input signal, via the interface 208, and transmit the input signal to the data processing system 102. To receive the input signal, the interface 208 may be activated by a user. For example, the user can select, click, or tap on the digital component 206 or the interface 208 to activate the interface 208 such that the interface 208 begins to receive input signals. Activating the interface 208 can cause input signals to go to the interface 208 rather than the interface through with the input signal 200 was received. The local digital assistant 134 can determine whether an input signal should be provided to the interface 208 or provided to the data processing system 102 (as input signal 200 was). For example, the local digital assistant 134 can process the input signal with a local instance of the NLP component 114 and provide the input signal to the interface 208 based on one or more terms parsed from the input signal and based on the context or keywords of the digital component 204.

The data processing system 102, when receiving input signals via the interface 208, can generate a response based on the knowledge graph 126. For example, the NLP component 114 can process the input signal to parse a request in the input signal. The request can be a request for additional information related to the digital component 204. For example, in the example illustrated in FIG. 2, the request can be for additional information regarding the ACME coffee maker. The data processing system 102 can use the knowledge graph 126 that is associated with the digital component 204 to generate a response to the request. For example, the knowledge graph 126 can be based on the landing page 135 that is associated with the digital component 204 such that the response provides responses specific to the entities, text, and other data contained within the landing page 135. For example, the request received via the interface 208 can be "what is the cost of the coffee maker?" The data processing system 102 can generate a response to the request using the knowledge graph 126. The response can include the cost of the coffee maker as indicated on the landing page 135.

The digital component 206 can be transmitted to the client computing device 104 in response to a search request. The digital component 206 can be transmitted to the client computing device 104 in response to a request for third-party content. For example, the client computing device 104 can load a web page that includes first-party content. The web page can include slots for third-party content. The web page can include scripts or other processor executable instruction that, when executed, cause the client computing device 104 to request third-party content from the data processing system 102. The data processing system 102, via the digital component selector 120, can select the digital component 206 based on entities, keywords, content, or data associated with the web page's first-party content. The data processing system 102 can generate the digital component 206 to include the digital component 204 from the digital component provider device 106 and the interface 208. The interface 208 can be processor executable instructions that cause the client computing device 104 to launch an instance of the local digital assistant. While the user views the web page that includes the first-party content and the digital component 206, the user can input signals into the interface 208. The interface 208 can transmit the input signals to the data processing system 102. The interface 208 can transmit the input signals to the data processing system 102 without causing the browser to leave the web page. This can enable the user to gather or request additional information about the digital component 204 without leaving the web page.

The client computing device 104 can include a voice-only interface. For example, rather than displaying the search response 202, the client computing device 104 can render the search response 202 as an output audio file. The digital components 206 and 204 can also be rendered to the user as an output audio signal, for example, after the rendering of the search response 202. The user can speak to the client computing device 104 to provide input signals to the interface 208.

Figure 3:
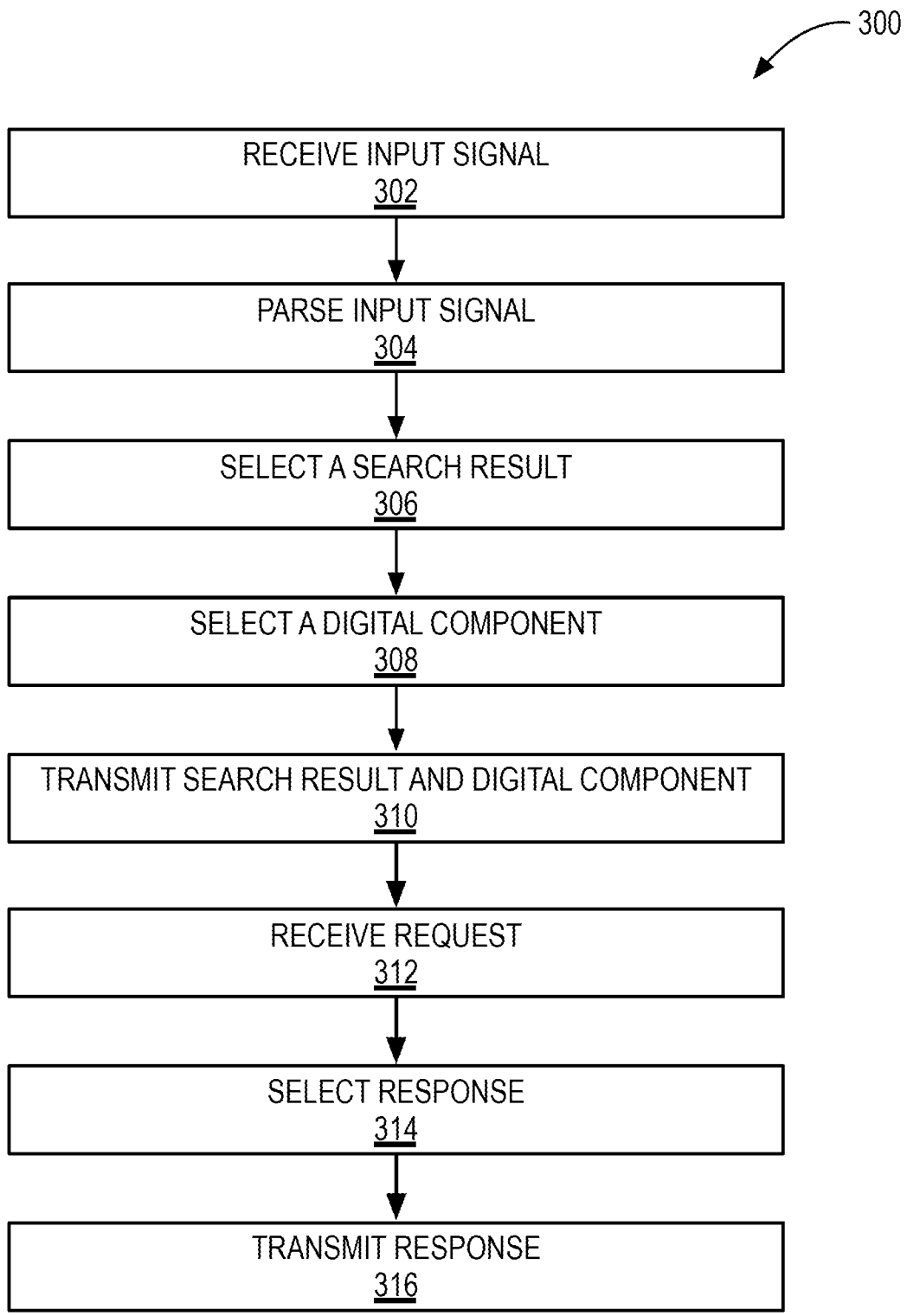
FIGS. 3 and 4 illustrate block diagrams of example methods to generate responses based on domain-specific natural language processing models in a networked system, in accordance with an example of the present disclosure.

FIG. 3 illustrates a block diagram of an example method 300 to generate responses based on domain-specific natural language processing models in a networked system. The method 300 can include receiving an input audio signal (ACT 302). The method 300 can include parsing the input audio signal (ACT 304). The method 300 can include selecting a search result (ACT 306). The method 300 can include selecting a digital component (ACT 308). The method 300 can include transmitting the search result and digital component (ACT 310). The method 300 can include receiving a request (ACT 312). The method 300 can include selecting a response (ACT 314). The method 300 can include transmitting the response (ACT 316).

The method 300 can include can include receiving an input signal (ACT 302). The method can include receiving, by an NLP component executed by a data processing system, the input signal. The input signal can be an input audio signal that is detected by a sensor at a first client device and transmitted to the data processing system. The sensor can be a microphone of the first client device. The input signal can be a typed request. A digital assistant component executed at least partially by a data processing system that includes one or more processors and memory can receive the input signal. The input signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the input for a session corresponding to the conversation.

The method 300 can include parsing the input signal (ACT 304). The NLP component of the data processing system can parse the input signal to identify a request. The request can be a search request. The request can be an intent or request for data, information, web pages, or a search. The NLP component can identify one or more entities, such as terms or phrases, in the request.

The method 300 can include selecting a search result (ACT 306). The data processing system can select a search result that is based at least on the search request parsed from the input signal. The data processing system can include or can interface with a search engine or search data processing system that can select one or more search results and provide the search results to the client computing device.

The method 300 can include selecting a digital component (ACT 308). The data processing system can select the digital component based on the search request. For example, digital component provider devices can provide the data processing system candidate digital components. The digital component provider device can associate or label the candidate digital components with keywords. The digital component selector can select one or more digital components from the candidate digital components based on a similarity between the digital components' keywords and entities (e.g., terms) identified in the request.

The similarity can be a match. For example, the data processing system can select a digital component having a keyword that is present as an entity in the request. For example, and referring to FIG. 2, the digital component 204 can be labeled with the keyword "coffee." The digital component selector can select the digital component 204 because the term "coffee" is present in the input signal 200.

The similarity can be based on a semantic relationship. For example, the search can be for vacation rentals and the data processing system can match the search to digital components that include the keyword "flight reservations" because the phrase "flight reservations" can be semantically related to vacation rentals.

The digital component can be associated with a data source, such as a landing page or other website. A digital component can be associated with a data source when the digital component includes a link to the data source. The digital component can include a link such that, when the link is activated by a client computing device, the link causes a web browser executed by the client computing device to retrieve the data source. The data processing system can generate a knowledge graph based on the data source. For example, the knowledge graph can be generated from the terms, phrases, or other entities included in the data source. A digital component provider device can generate the knowledge graph and provide the knowledge graph to the data processing system with the candidate digital components.

The method 300 can include transmitting the result and digital component (ACT 310). The data processing system can transmit the search result and the digital component to the client computing device that transmitted the input signal to the data processing system. Once the client computing device receives the result and the digital component, the client computing device can render the result and the digital component. Rendering the digital component can cause the activation or execution of an instance of a local digital assistant at the client computing device. The local digital assistant can render or otherwise display the digital component. The local digital assistant can render or otherwise display the result.

The digital component can include an interface to the knowledge graph. For example, the digital component, when rendered, can present an input interface, such as a graphical interface, to the user. Via the input interface, the user can input requests. The requests can be transmitted to the data processing system via the digital component.

The method 300 can include receiving the request (ACT 312). The request can be within an input signal. The input signal can be an audio-based or a text-based input signal. For example, the user can speak a question to the input interface which can be detected by a microphone of the client computing device. The local digital assistant can receive the input signal and transmit the input signal to the data processing system. When the input signal is an input audio signal, the NLP component can receive the input signal and parse the request from the input signal.

The method 300 can include selecting a response (ACT 314). The digital component selector can select the response to the request included in the input signal. The data processing system can generate the response based on the knowledge graph that is associated with the digital component that was transmitted to the client computing device at ACT 310.

The method 300 can include transmitting the response (ACT 316). The data processing system can transmit the response to the client computing device. The data processing system can include the response into a digital component that includes the response and instructions for how to render the response at the client computing device. The client computing device can render or display the response within the digital component transmitted to the client computing device at ACT 310. Rendering the response within the digital component previously transmitted to the client computing device can enable the response to be presented to the user without changing or altering content currently displayed to the user. For example, and also referring to FIG. 2, rendering the result within the digital component 206 can enable the input signal 200 and the search response 202 to remain displayed to the user while the user requests and receives additional information about the digital component 204.

Figure 4:
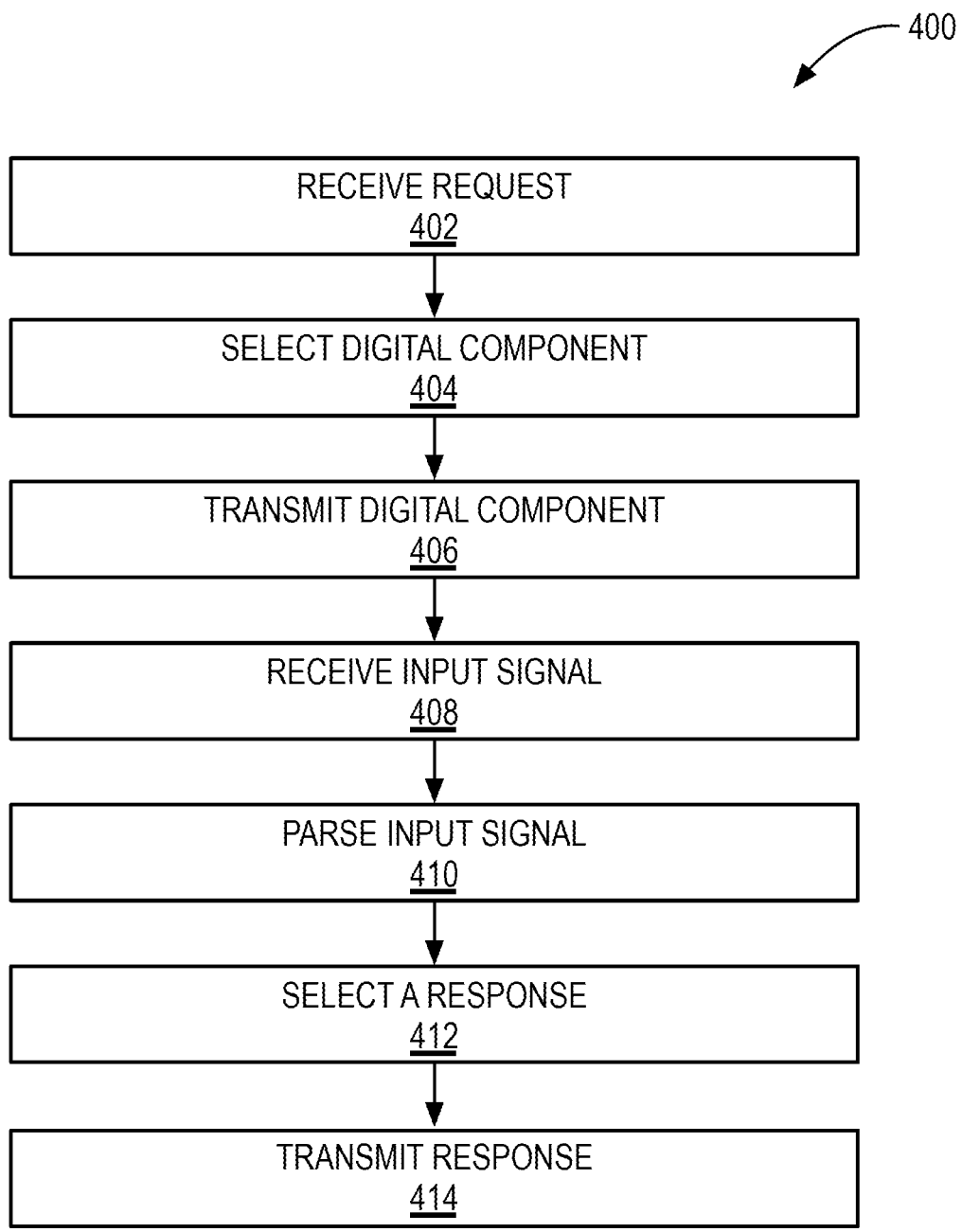

FIG. 4 illustrates a block diagram of an example method 400 to generate responses based on domain-specific natural language processing models in a networked system. The method 400 can include receiving a request (ACT 402). The method 400 can include selecting a digital component (ACT 404). The method 400 can include transmitting the digital component (ACT 406). The method 400 can include receiving an input signal (ACT 408). The method 400 can include parsing the input signal (ACT 410). The method 400 can include selecting a response (ACT 412). The method 400 can include transmitting the response (ACT 414).

The method 400 can include receiving a request (ACT 402). The request can be a request for third-party content. The request can be received from a client computing device. For example, the client computing device can include a web browser. The web browser can receive and render a website that includes first-party content. The website can include slots for third-party content. The slots can include processor executable instructions that can cause the web browser to transmit a content request to the data processing system. The request can include content parameters. The content parameters can be size requirements for the returned digital component or keywords that the data processing system can use to select the digital component.

The method 400 can include selecting a digital component (ACT 404). The data processing system can select a digital component from a plurality of digital components. The digital component selector of the data processing system can select the digital component. The digital component selector can select multiple digital components via a real-time content selection process. The digital component selector can score and rank the digital components. The digital component selector can select a digital component from a plurality of digital components based on the score and rank of the digital components. For example, the digital component selector can select the digital component with the highest rank or score. The data processing system can include the digital component into another digital component with an interface to a knowledge graph associated with the selected digital component.

The method 400 can include transmitting the digital component (ACT 406). The data processing system can transmit the selected digital component to the client computing device. The client computing device can receive the digital component and render the digital component in one of the slots of the web page as third-party content. Rendering the digital component with the first-party content can present an interface to the knowledge graph associated with the digital component to an end user. For example, the rendering of the digital component can cause the client computing device to launch or execute a local instance of the digital assistant. The interface can be configured to receive input signals. The input signals can be text-based or audio-based. The client computing device can transmit the input signal received via the digital component to the data processing system.

The method 400 can include receiving the input signal (ACT 408). The method 400 can include receiving, by an NLP component executed by a data processing system, the input signal. The input signal can be an input audio signal that is detected by a sensor at a first client device and transmitted to the data processing system. The sensor can be a microphone of the first client device. The input signal can be a typed request. A digital assistant component executed at least partially by a data processing system that includes one or more processors and memory can receive the input signal.

The method 400 can include parsing the input signal (ACT 410). The NLP component of the data processing system can parse the input signal to identify a request. The request can be a search request. The request can be an intent or request for data, information, webpages, or a search. The NLP component can identify one or more entities, such as terms or phrases, in the request. For example, the request can be for information or data related to the digital component provided to the client computing device as third-party content.

The method 400 can include selecting a response (ACT 412). The digital component from which the input signal was transmitted can be associated with a knowledge graph. The knowledge graph can be generated from the terms or entities contained within a data source (e.g., a landing page) that is associated with the digital component. The data processing system can select the response based on the knowledge graph associated with the digital component. For example, the data processing system's NLP component can use the knowledge graph to generate the response based on the entities and data contained in the landing page.

The method 400 can include transmitting the response (ACT 414). The data processing system can transmit the response to the client computing device. The client computing device can receive the response and render the response within the digital component transmitted to the client computing device at ACT 406. Rendering the response within the digital component can enable the response to be presented to the user without changing or altering the first-party content presented to the user. For example, the user does not need to leave the original website displaying the first-party content to view or receive the response.

Figure 5:
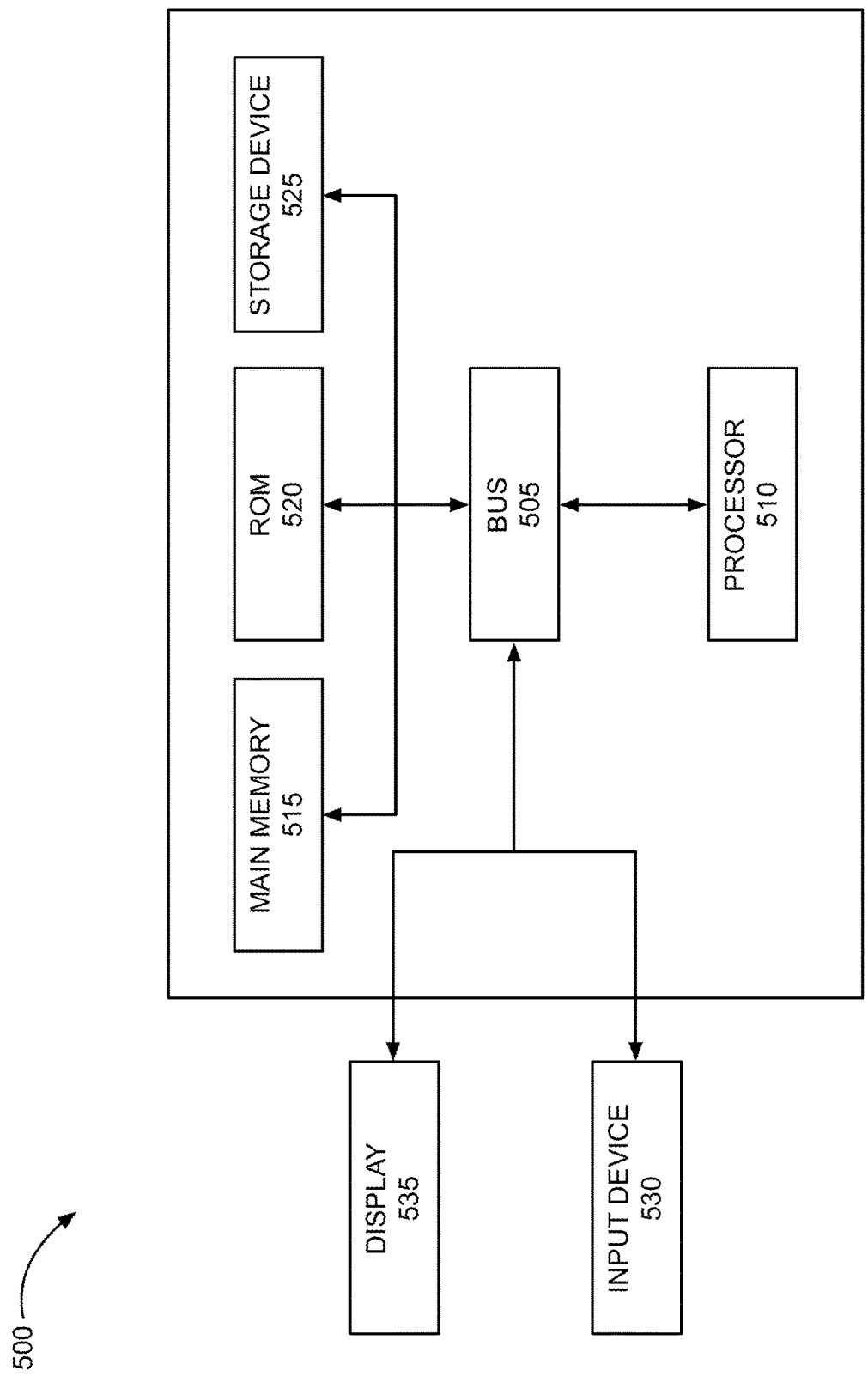
FIG. 5 illustrates a block diagram of an example computer system that can be used in the system illustrated in FIG. 1, in accordance with an example of the present disclosure.

FIG. 5 is a block diagram of an example computer system 500. The computer system or computing device 500 can include, or be used to implement, the system 100 or its components such as the data processing system 102. The data processing system 102 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 124. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid-state device, magnetic disk or optical disk, can be coupled to the bus 505 to persistently store information and instructions. The storage device 525 can include or be part of the data repository 124.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys for communicating direction information and command selections to the processor 510 and for controlling cursor movement on the display 535. The display 535 can be part of the data processing system 102, the client computing device 104 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs (e.g., one or more circuits of computer program instructions), encoded on one or more computer storage media for execution by, or to control the operation of, data processing apparatuses. Alternatively, or in addition, the program instructions can be encoded on an artificially generated propagated signal (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry (e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures. For example, the interface 110, digital component selector 120, domain processor 117, or NLP component 114 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document) in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry (e.g., an FPGA or an ASIC). Devices suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

The subject matter described herein can be implemented in a computing system that includes a back end component (e.g., as a data server), or that includes a middleware component (e.g., an application server), or that includes a front end component (e.g., a client computer having a graphical user interface or a web browser through which a user can interact with an implementation of the subject matter described in this specification), or a combination of one or more such back end, middleware, or front end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of a client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 104 or the digital component provider device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114, domain processor 117, or the digital component selector 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to interface with domain-specific query processing models in networked systems, comprising:
   a data processing system having one or more processors coupled with memory, to:
   transmit, to a client device, a digital component to be presented via the client device, the digital component comprising:
   an input interface to process a first query acquired via the client device in accordance with a query processing model in response to an activation of the digital component, the query processing model generated using a plurality of entities identified from a data source; and
   a link to access an information resource of the data source in response to an activation of the link;

receive, in response to the activation of the digital component on the client device, the first query passed via the input interface of the digital component;

generate, in accordance with the query processing model, a response corresponding to at least one of the plurality of entities based on the first query; and transmit, to the client device, the response to be presented with the digital component.

2. The system of claim 1, comprising the data processing system to:

identify, from an input audio signal received prior to the first query and acquired via the client device, a second query; and determine that the digital component is to be presented via the client device based on the second query.

3. The system of claim 1, comprising the data processing system to:

parse an input audio signal that is received prior to the first query and acquired via the client device, to identify a second query; and identify, using the second query, a search result to be presented with the digital component via the client device.

4. The system of claim 1, comprising the data processing system to:

select, from a plurality of content providers, the content provider based on a second query received prior to the first query and acquired via the client device; and identify the link associated with the content provider to include in the digital component.

5. The system of claim 1, comprising the data processing system to:

identify, based on a second query received prior to the first query and acquired via the client device, the data source; and generate, using the plurality of entities identified from the data source, the query processing model defining semantic relationships among the plurality of the entities.

6. The system of claim 1, comprising the data processing system to:

determine, for each of a plurality of candidate digital component, a score based on a second query received prior to the first query and acquired via the client device in accordance with a content selection process; and select, from the plurality of candidate digital components, the digital component to present via the client device.

7. The system of claim 1, comprising the data processing system to:

receive, subsequent to the first query, a second query passed via the input interface of the digital component;

identify, based on the second query, a second data source comprising a second plurality of entities; and generate, using the plurality of entities from the data source and the second plurality of entities from the second data source, a second query processing model to present on the client device.

8. The system of claim 1, comprising the data processing system to:

identify, from an input audio signal acquired via the client device, a second query;

determine that the second query is a request for search results; and transmit, to the client device, a search result identified based on the second query.

9. The system of claim 1, comprising the data processing system to:

generate the query processing model to include a plurality of nodes and a plurality of edges, the plurality of nodes corresponding to the plurality of entities, the plurality of edges corresponding to a corresponding plurality of relationships between a respective pair in the plurality of entities; and assign, to each edge of the plurality of edges, a weight to a corresponding relationship of the plurality of relationships based on a semantic distance between the respective pair.

10. The system of claim 1, comprising the data processing system to generate, using the response generated in accordance with the query processing model, a second digital component to present on the digital component via the client device.

11. The system of claim 1, comprising the data processing system to receive the first query routed via the input interface of the digital component instead of a second input interface, in response to the activation of the digital component via an interaction event.

12. The system of claim 1, comprising the data processing system to transmit, to the client device, the digital component to be presented via an information resource rendered on a display of the client device.

13. A method of interfacing with domain-specific query processing models in networked systems, comprising:

transmitting, by a data processing system to a client device, a digital component to be presented via the client device, the digital component comprising:

an input interface to process a first query acquired via the client device in accordance with a query processing model in response to an activation of the digital component, the first query processing model generated using a plurality of entities identified from a data source; and a link to access an information resource of the data source in response to an activation of the link;

receiving, by the data processing system, in response to the activation of the digital component on the client device, the first query passed via the input interface of the digital component;

generating, by the data processing system, in accordance with the query processing model, a response corresponding to at least one of the plurality of entities based on the first query; and transmitting, by the data processing system to the client device, the response to be presented with the digital component.

14. The method of claim 13, comprising:

identifying, by the data processing system, from an input audio signal received prior to the first query and acquired via the client device, a second query; and determining, by the data processing system, that the digital component is to be presented via the client device based on the second query.

15. The method of claim 13, comprising:

parsing, by the data processing system, an input audio signal that is received prior to the first query identifying, by the data processing system, using the second query, a search result to be presented with the digital component via the client device.

16. The method of claim 13, comprising:

identifying, by the data processing system, based on a second query received prior to the first query and acquired via the client device, the data source; and generating, by the data processing system, using the plurality of entities identified from the data source, the query processing model defining semantic relationships among the plurality of the entities.

17. The method of claim 13, comprising:

determining, by the data processing system, for each of a plurality of candidate digital component, a score based on a second query received prior to the first query and acquired via the client device in accordance with a content selection process; and selecting, by the data processing system, from the plurality of candidate digital components, the digital component to present via the client device.

18. The method of claim 13, comprising:

receiving, by the data processing system, subsequent to the first query, a second query passed via the input interface of the digital component;

identifying, by the data processing system, based on the second query, a second data source comprising a second plurality of entities; and generating, by the data processing system, using the plurality of entities from the data source and the second plurality of entities from the second data source, a second query processing model to present on the client device.

19. The method of claim 13, comprising generating, by the data processing system, using the response generated in accordance with the query processing model, a second digital component to present on the digital component via the client device.

20. The method of claim 13, comprising receiving, by the data processing system, the first query routed via the input interface of the digital component instead of a second input interface, in response to the activation of the digital component via an interaction event.

* * * * *